United States Patent
Khabardar et al.

[11] Patent Number: 6,049,834
[45] Date of Patent: Apr. 11, 2000

[54] LAYER 3 SWITCH UNICAST PROTOCOL

[75] Inventors: Percy Khabardar; Norman William Finn, both of San Jose, Calif.

[73] Assignee: Cisco Technology, Inc., San Jose, Calif.

[21] Appl. No.: 09/075,269

[22] Filed: May 8, 1998

[51] Int. Cl.[7] .................................. G06F 15/173
[52] U.S. Cl. .................... 709/242; 709/238; 370/466
[58] Field of Search ............................ 370/389, 469, 370/466, 254; 709/238, 242

[56] References Cited

U.S. PATENT DOCUMENTS

| | | | |
|---|---|---|---|
| 5,299,194 | 3/1994 | Ichii et al. ......................... | 370/445 |
| 5,309,437 | 5/1994 | Perlman et al. . | |
| 5,323,394 | 6/1994 | Perlman . | |
| 5,500,860 | 3/1996 | Perlman et al. . | |
| 5,509,123 | 4/1996 | Dobbins et al. ..................... | 709/243 |
| 5,583,996 | 12/1996 | Tsuchiya .......................... | 709/218 |
| 5,612,957 | 3/1997 | Gregerson . | |
| 5,659,686 | 8/1997 | Hou . | |
| 5,754,547 | 5/1998 | Nakazawa . | |
| 5,914,939 | 6/1999 | Serkowski ......................... | 370/254 |
| 5,920,566 | 7/1999 | Hendel et al. ..................... | 370/401 |
| 5,920,705 | 7/1999 | Lyon et al. ........................ | 709/240 |

*Primary Examiner*—Zarni Maung
*Assistant Examiner*—Bradley Edelman
*Attorney, Agent, or Firm*—Jay A. Chesavage

[57] ABSTRACT

A process for the reliable distribution of a shortcut table for layer 3 switching is distributed from a plurality of routers to a plurality of switches includes the transmission by the router of a list of shortcut entries, which includes a list of switches which have acknowledged receipt of this list of shortcut entries. The transmission of these database messages continues until all target switches have acknowledged receipt of the database messages. The interval between transmission of database messages is short until all switches have acknowledged reception of such database messages, and thereafter the interval between transmissions is lengthened, and a hello message is sent until a new switch is added to the network, or a change in router shortcut database occurs, whereafter the transmission of database messages is resumed utilizing the interval between these transmissions is again shortened until all such messages have been acknowledged.

27 Claims, 5 Drawing Sheets

|  | 45 MAC SA | 49 MAC DA | 46 VLAN | 47 ENABLE SC | 52 PERMIT (DENY) | 48 IP-SA/IP-DA/TAG/IP_PORT | 50 PORT | 51 Description | |
|---|---|---|---|---|---|---|---|---|---|
| 42a | A1 | -- | -- | -- | -- | ----/----/--/-- | P1 | Local Address | ⎫ |
| 42b | A2 | -- | WX | -- | -- | ----/----/--/-- | P2 | Local Address | ⎪ L2 |
| 42c | R1a | -- | YZ | -- | -- | ----/----/--/-- | P3 | Local Address | ⎬ Forwarding |
| 42d | R1b | -- | -- | -- | -- | ----/----/--/-- | P4 | Local Address | ⎪ Table |
| 42e | B2 | -- | -- | -- | -- | ----/----/--/-- | P5 | Local Address | ⎪ |
| 42f | B1 | -- | -- | -- | -- | ----/----/--/-- | P6 | Local Address | ⎭ |
| 44a | -- | B2 | -- | 1 | P | ----/1.0.1.2/--/-- | P5 | Layer 3 DA only | ⎫ |
| 44b | -- | B2 | -- | 1 | P | 1.0.0.1/1.0.1.2/--/-- | P5 | Layer 3 SA/DA Flow | ⎬ L3 Shortcut |
| 44c | -- | B2 | -- | 1 | P | ----/----/CE/-- | P2 | Layer 3 Tag | ⎪ Table |
| 44d | -- | A1 | -- | 1 | D | 1.0.1.1/1.0.0.1/--/07 | P1 | Layer 3 SA/DA Flow | ⎭ |

(network diagram)

- 1.0.0.1 — A1 (80)
- 1.0.0.2 — A2 (84)
- 1.0.1.4 — R2 (89)
- S2 (82)
- 1.0.2.1 — C1 (81)
- 1.0.1.1 — B1 (82)
- 1.0.1.2 — B2 (86)
- 1.0.0.3 R1a / 1.0.1.3 R1b — R1 (90)
- S1 with ports P1, P2, P3, P4, P5, P6, P7
- Link 88

Figure 5b:

LAYER 2 SWITCHED FRAME (Within Subnet): A1 -> A2

| In P1 | Out P2 |
|---|---|
| MAC SA = A1<br>MAC DA = A2<br>IP SA = 1.0.0.1<br>IP DA = 1.0.0.2 | MAC SA = A1<br>MAC DA = A2<br>IP SA = 1.0.0.1<br>IP DA = 1.0.0.2 |
| 92 | 94 |

Figure 5c:

LAYER 3 ROUTED FRAME (Across Subnet): A1 -> B2

| In P1 | Out P3 | In P4 | Out P5 |
|---|---|---|---|
| MAC SA = A1<br>MAC DA = R1a<br>IP SA = 1.0.0.1<br>IP DA = 1.0.1.2 | MAC SA = A1<br>MAC DA = R1a<br>IP SA = 1.0.0.1<br>IP DA = 1.0.1.2 | MAC SA = R1b<br>MAC DA = B2<br>IP SA = 1.0.0.1<br>IP DA = 1.0.1.2 | MAC SA = R1b<br>MAC DA = B2<br>IP SA = 1.0.0.1<br>IP DA = 1.0.1.2 |
| 96 | 98 | 100 | 102 |

Figure 5d:

LAYER 3 SWITCHED FRAME (Across Subnet): A1 -> B2

| Into P1 | Out P5 |
|---|---|
| MAC SA = A1<br>MAC DA = R1a<br>IP SA = 1.0.0.1<br>IP DA = 1.0.1.2 | MAC SA = R1b<br>MAC DA = B2<br>IP SA = 1.0.0.1<br>IP DA = 1.0.1.2 |
| 104 | 106 |

Figure 6: Switch Protocol

Figure 7: Router Protocol

6,049,834

LAYER 3 SWITCH UNICAST PROTOCOL

FIELD OF THE INVENTION

The current invention applies to the field of network configuration protocols wherein a router containing layer 3 shortcut table information transmits said information to a plurality of switches.

BACKGROUND OF THE INVENTION

Computer networks comprise interconnected switches and routers responsible for the forwarding of packet traffic generated principally by computers as end stations. The function of each of these switches and routers is to provide an appropriate degree of isolation between various parts of the network, which has the effect of increasing the packet bandwidth available to each user of the network. The level of isolation provided by each of these elements is related to the hierarchy level in which each operates in the 7 layers defined by the OSI Reference Model. Routers operate on the user-assigned network addresses of layer 3, while switches (also known as bridges) operate using the manufacturer-assigned MAC (media access control) address of layer 2. Routers operate on layer 3 network addresses, which comprise a subnet, and a host. The router is examining the most efficient route to move data from a first subnet to a second subnet, and modifying the MAC address of the forwarded frames when moving data from one subnet to another across network addresses. Routers typically support different protocols, among which IP and IPX are common. A switch uses only information it learns from MAC addresses presented by surrounding switches or hosts, and only forwards frames within a single subnet. Since only the MAC address of each received packet is examined by the switch, it relies on fast movement of data from one port to another, based only on end-station MAC address information contained in such frames. The switching decision is then made based on simple and fast algorithms, and for layer 2 IEEE standard 802 packets, the source and destination MAC addresses are available in known locations within the frame, and can be used regardless of which layer 3 protocol is in operation. In this manner, layer 2 switches typically utilize a series of high speed, low cost state machines implemented in hardware logic for the movement of data, but are limited to switching within a single subnet. Routers, by contrast, operate on network layer 3 addresses, and whereas switches are confined to moving information within a single subnet, a router will modify the MAC addresses of the frames to enable forwarding across subnets. A new class of switch enables the router to send information to a switch such that layer 3 frames which would normally be routed between subnets are modified and forwarded between the subnets by the switch, using the forwarding information provided by the router.

OBJECTS OF THE INVENTION

A first object of the invention is to enable the distribution of layer 3 shortcut table entries throughout a large network of switches. A second object of the invention is to distribute layer 3 shortcut table entries reliably throughout a large network of switches. A third object of the invention is to enable orderly network configuration in the presence of layer 3 shortcut table changes through the confirmation of receipt of all such shortcut table changes by all affected switches in the network prior to enabling these changes to the shortcut tables.

SUMMARY OF THE INVENTION

The present invention is directed to a class of protocols for the automatic distribution of shortcut table information. A router periodically transmits shortcut database messages containing either a complete list of shortcut table entries, or an incremental change list of shortcut table entries to be used to modify the previous contents of the shortcut table. The shortcut database message also contains a switch acknowledgement list which is a list of switches having acknowledged receipt of this shortcut database message, as well as a shortcut enable field which is used to enable or disable these shortcuts until all switches have acknowledged receipt of the current shortcut database message. The switch sends a shortcut trigger message when it is initialized, and sends a switch acknowledgement message when it has properly received a shortcut database message. The contents of the shortcut database message are applied to the switch forwarding table. The router responds to a switch trigger message by sending a shortcut database message, and adding the new switch to the internally stored list of known switches, known as the SWITCH_LIST. The shortcut database message sent by the router contains a list of switches which have acknowledged receipt of the shortcut database messages. When a switch receives a database message listing itself in the list of acknowledged switches, it sends no further messages. When a router has received switch acknowledgement messages from all switches in the SWITCH_LIST, it stops sending shortcut database messages having the ENABLE_SHORTCUT bit set to disable, and thereafter sends router hello messages containing the SWITCH_ACK_LIST, and the ENABLE_SHORTCUT bit set to enable. These router hello messages are sent at a much less frequent rate than the rate of shortcut database messages.

DETAILED DESCRIPTION OF THE INVENTION

Figure 1:
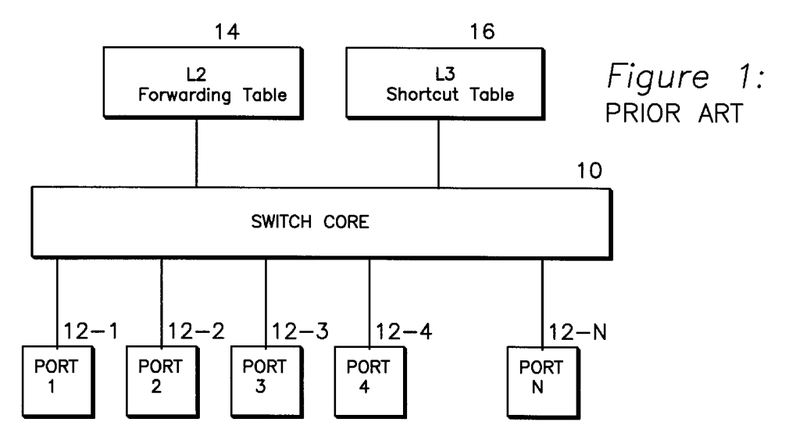
FIG. 1 is the block diagram of a network switch.

FIG. 1 shows a typical network layer 3 switch. Switch Core 10 receives frames from port #1 12-1, port #2 12-2, and so on. Layer 2 Forwarding Table 14 and layer 3 shortcut table 16 may be either a shared resource presented to all ports through the switch core 10 or individually associated with each port 12-1,2,3 etc. Each frame arriving at a port 12 has its layer 2 and layer 3 destination addresses examined in shortcut table 16 and forwarding table 14 to determine which other port it should be forwarded, if any, as will be described later.

Figure 2:
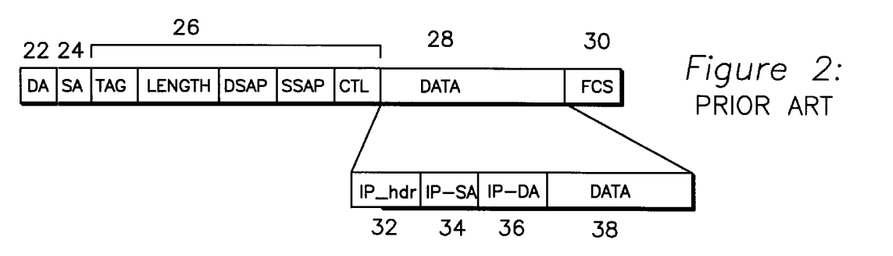
FIG. 2 is an IEEE 802.3 frame containing an IP frame.

FIG. 2 shows the data format of an IEEE 802 frame, as described in IEEE 802.1. The relevant fields of interest to the switch are the 6 byte destination address 22, and the 6 byte source address 24. The remainder of the frame contains control fields 26 comprising an optional tag as described in IEEE 802.1Q, length, destination service access point, source service access type, and a control field. The data field 28 is variable length 39 to 1497 bytes, and the frame check sequence 30 provides information about the integrity of the entire frame utilizing a CRC polynomial. The contents of the remainder of the data 28 is not generally of interest to a switch operating on the layer 2 MAC addresses 22 and 24. The destination address 22 is the MAC address of the desired end station in a subnet, while the source address 24 is the MAC address of the originating station in a subnet. In general, this is sufficient information for both the learning of layer 2 addresses on the network and the delivery of frames to desired destinations because the source and destination addresses 22 and 24 of each 802 frame are not modified with each forwarding event from one switch to another. In this manner, each switch keeps a record of source addressees, so the location of each station is known to be present on a particular port of a switch. For layer 3 switching, the contents of the data field 28 will typically include information particular to the protocol being run. For the case of the Internet Protocol, commonly known as IP, an IP header 32, IP source address 34, and IP destination address 36 precede the data field 38. Other protocols, such as IPX and appletalk, also provide this information in their own specific formats.

Figure 3:
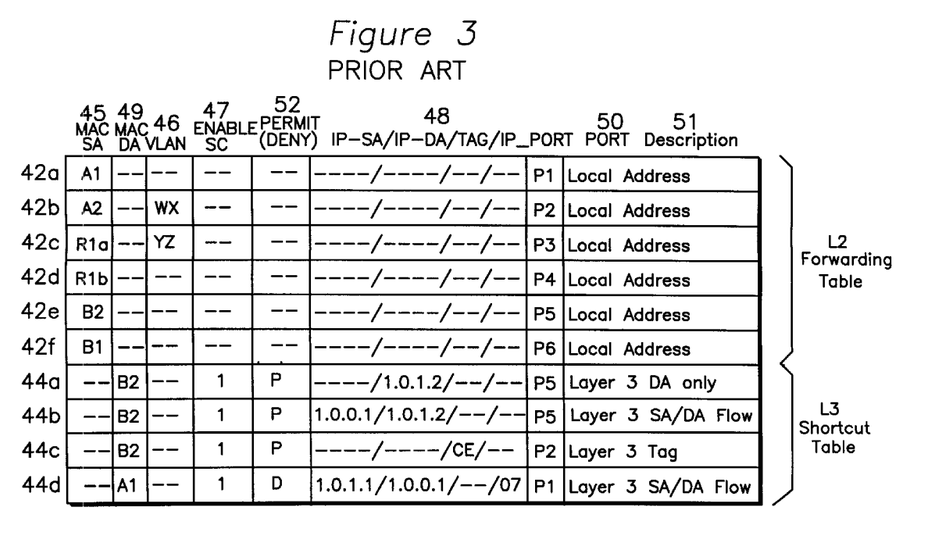
FIG. 3 is a detail showing the arrangement of data in the forwarding table of FIG. 1.

FIG. 3 shows the data associations for forwarding table 14 comprising entries 42a–f, and shortcut table 16 comprising entries 44a–d. The columns of interest for the layer 2 forwarding table are the MAC Source Address 45, the VLAN number 46, and the MAC destination address 49. For layer 3 shortcuts, the fields of interest are the MAC DA 49, the layer 3 ENABLE_SHORTCUT flag 47, and a field 48 to match for combinations of IP source address, IP destination address, an L3 flow tag, and the IP port number. Each table entry 42a–f and 44a–d has a forwarding port 50, which is the port to which the frame is to be forwarded. Layer 2 switching involves only an examination of the MAC source address 24 and MAC destination address 22. As will be described later, the association between port 50 and source address 45 is discovered by receiving packets bearing a source address 24 on that given port. This information is used later to determine which port to forward packets bearing a particular MAC Destination Address 22. Layer 3 shortcuts involves entries 44a–d, which are provided in a database sent by the router, as will be described later.

Figure 4:
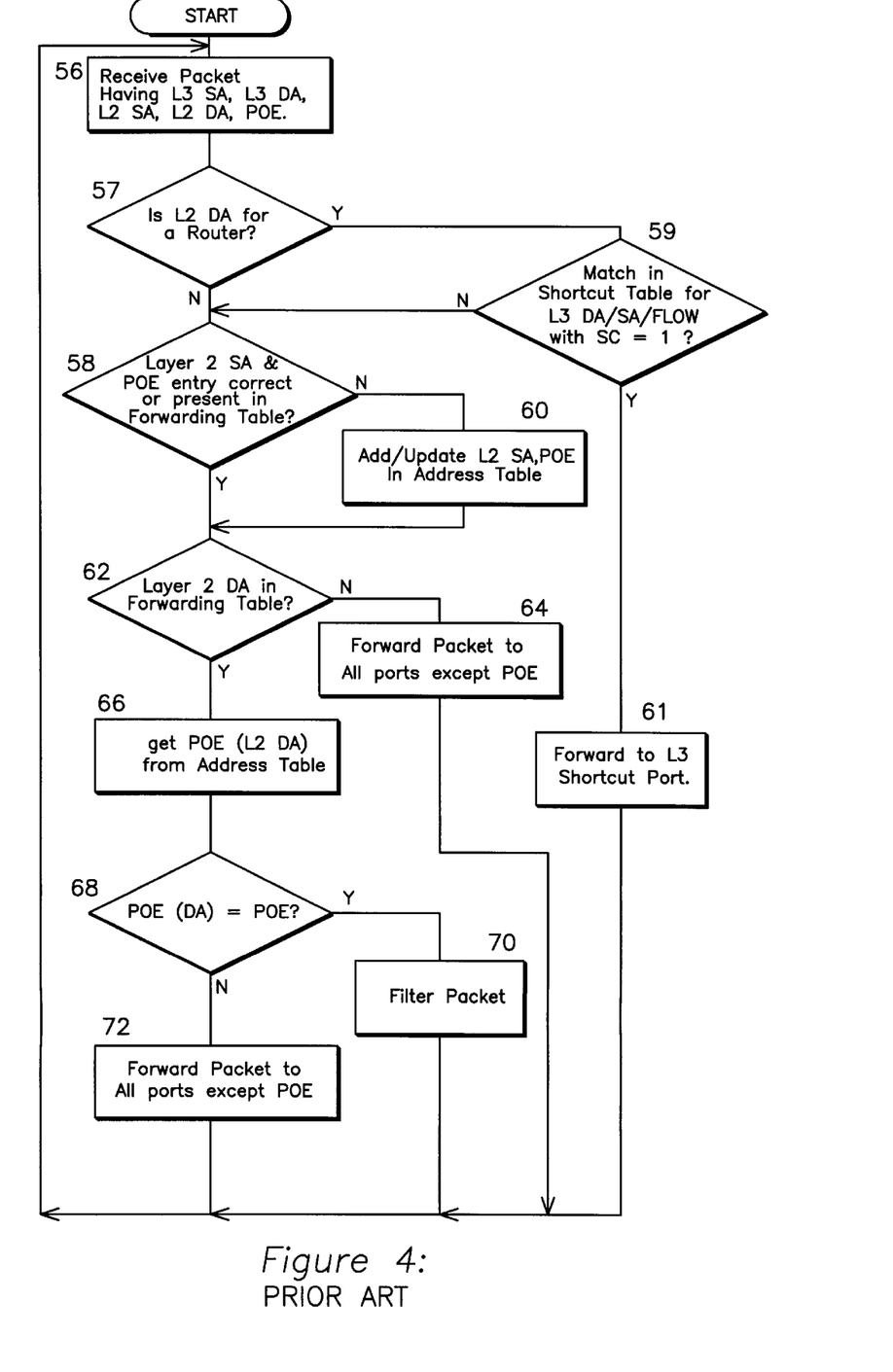
FIG. 4 is a flowchart showing the operation of a switch capable of forwarding layer 2 and layer 3 frames.

FIG. 4 shows the processing flowchart for each received frame. An 802.3 frame of the type described in FIG. 2 and having for the purposes of example layer 2 SA=A1 and layer 2 DA=A2 and a port of P2 is received at a port 12-1. The switch core 10 extracts the MAC (layer 2) destination address (DA) 22, the MAC source address (SA) 24, and the port of entry (POE) 12-1 in first step 56, in addition to the layer 3 source and destination addresses. For the case 57 where there the layer 2 DA is not that of a router, step 58 looks in the layer 2 forwarding table of FIG. 3 to determine if the source address A1 is present. If the source address is not known to the switch, or it is associated with a port of entry which is no longer current, it is added or updated in step 60. In this example, it was previously added as entry 42a. An earlier packet received having SA=A2 was recorded in the forwarding table as entry 42b. Step 62 examines the destination address (DA) 22 to process the received frame in one of the following 3 classes. If the destination address is not known to the switch in step 62, the frame should be forwarded to all ports of the switch except the port of entry, as described in step 64. This is also the case for frame with a multicast/broadcast DA. Otherwise, the port of entry is found from the address table in step 66. If the DA is known to the switch as in step 68, then it is either local to the port and the received frame should be filtered (not forwarded to any other port) as described in step 70, or the DA is known to be on a different port, and the received frame should be forwarded to that port as described in step 72. In this manner, the switch is able to forward frames to only the desired port when the destination address is known to the switch. For the case 59 where the layer 2 destination address is that of a router, and a layer 3 address match is found in the layer 3 shortcut table, and hardware shortcuts are enabled (ENABLE_SHORTCUT=1) 47, the switch must rewrite the packet source and destination layer 2 addresses, and then forward the packet to the port shown in column 50, including a rewrite of the packet in step 61. This rewrite process may also modify other fields, such as the FCS 30, and protocol dependant fields such as the TTL (time to live) field for the Internet Protocol (IP), or control fields for the IPX protocol.

There are three kinds of shortcut table matches with the ENABLE_SHORTCUT bit 47 set, and each type of entry also has a permit/deny field in the shortcut table. The first type of match is a simple layer 3 destination address match, for which any IP packet matching this destination address is forwarded to the port identified in 50. The second type of match is both source and destination IP address, such as the entry of 44b. The third type of match is source, destination, and IP Port. The IP Port number is a uniquely assigned number for a particular type of IP service, such as a particular telnet session. Each of these three types of matches also carries the permit/deny flag 52, which indicates to the switch that after a Layer 3 match is found, the packets are to be forwarded for permit type, or sent to the router for deny type. In the present invention, it is assumed that all of the layer 3 shortcut information that would populate the entries 44a, b, c,d, and so forth would be provided by the routers servicing that subnet. In practice, each router would be providing each of the layer 3 shortcuts necessary to traverse each of the individual subnets serviced by that particular router. For example, Router R1 90 of FIG. 5a would provide layer 3 shortcuts to switch S1, while router R2 89 would provide shortcuts to switches S1 88 and S2 82. In this manner, each router is providing a list of permit/deny layer 3 shortcut table entries to a plurality of switches, and each switch is receiving shortcut table entries from a plurality of routers. In the most general case, the router is providing shortcut database messages including the layer 2 router MAC destination address, an access type (permit or deny), a protocol type (IP, IPX, Appletalk, or any other protocol in use), and a match type (Layer 3 Destination Address only, Layer 3 Destination and Source Address, Layer 3 Destination Address and Source Address and Protocol ID). In this manner, the router is able to continue to control routing decisions, while offloading the forwarding task to the much faster layer 2 switching device. Once a match occurs, the packet is modified with the new layer 2 addresses shown in the shortcut table. For example, IP frames having IP-SA=1.0.2.1 and IP-DA=1.0.1.2 (station C1 81 sending to station B2 86) will match only with line 44a, and the frame will have the Layer 2 MAC address modified to show it as having been sent by R1 90 to B2 86. As a second example, if the frame containing IP traffic sent by 1.0.1.1 (B1 82) to 1.0.0.1 (A1 80) with an IP port of 07, which for the purpose of this example is a telnet session, entry 44d would show a deny entry 52, so packets to this host A1 would be forwarded to the router for processing.

Changes in network topology are accommodated in two ways. With the passage of time, entries are periodically deleted from the forwarding table, starting with the oldest entries. In this manner, as equipment is removed from the network, so are the address references removed from the forwarding table. For clarity, this per-entry aging value is not shown in FIG. 3. If network equipment is removed from one location and added to a different location, during the SA lookup phase 58, an updated POE entry would be made to the forwarding table to reflect this topology change.

Figure 5A:
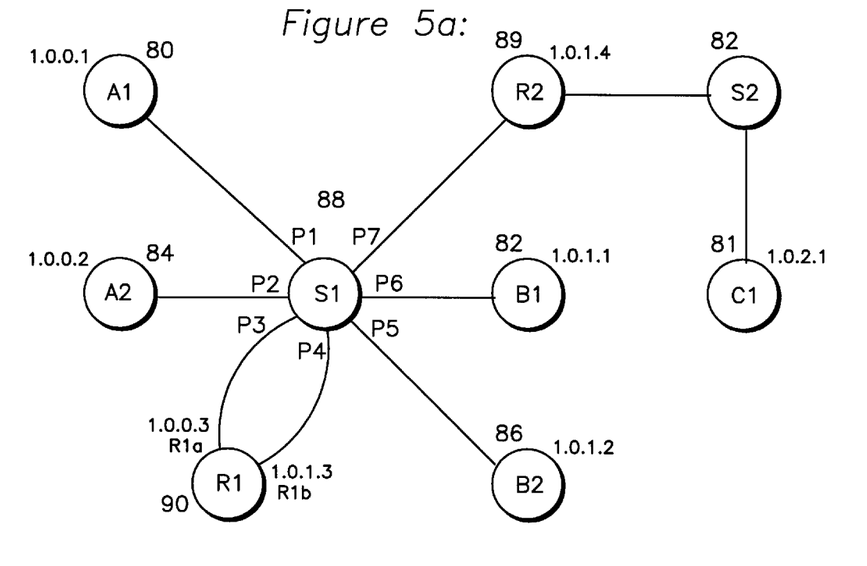
FIG. 5a is a topology map of hosts, routers, and switches.

FIG. 5a shows the topology of routers, switches, and host end stations comprising a network. In this example, stations A1 80, A2 84, B1 82, and B2 86 have the respective MAC addresses A1, A2, B1, and B2, and the network IP addresses 1.0.0.1, 1.0.0.2, 1.0.1.1, and 1.0.1.2. Hosts A1 80 and A2 84 are said to be on the 1.0.0.0 subnet, while hosts B1 82 and B2 86 are on the 1.0.1.0 subnet. Central to these two subnets is switch S1 88, shown having 6 ports. Switched packets would be isolated from crossing these two subnets, although they are both common to switch S1 88. Host C1 81 having MAC address C1 and IP address 1.0.2.1 (on the 1.0.2.0 subnet) is connected to switch S1 88 via router R2 89 and switch S2 82. Operating as layer 2 switches, S1 and S2 have no network or MAC addresses of their own, but simply forward frames without modifying them. The relative operation of a switch and router is shown in the FIGS. 5b,c, and d.

Figure 5B:
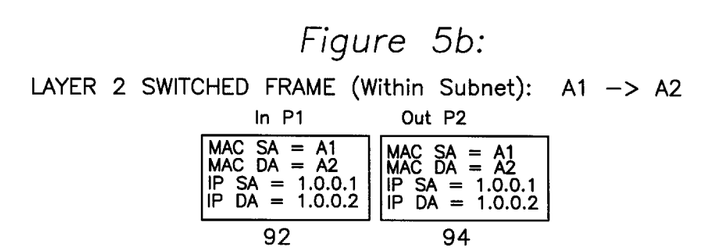
FIG. 5b shows the header information for a layer 2 switched frame.
Figure 5C:
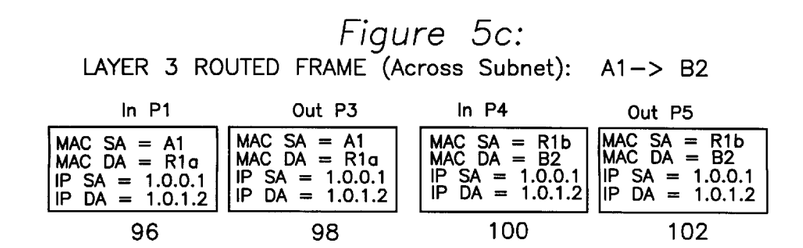
FIG. 5c shows the header information for a layer 3 routed frame.
Figure 5D:
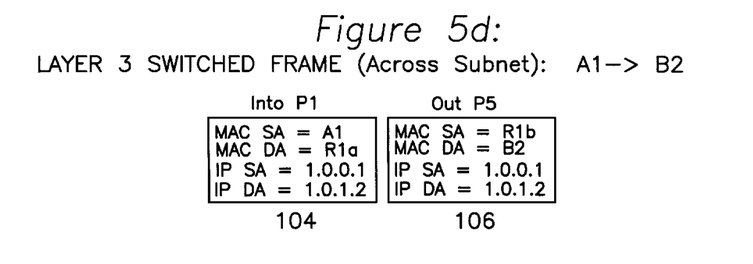
FIG. 5d shows the header information for a layer 3 switched frame.

FIG. 5b shows the case of a layer 2 switched frame, wherein a frame enters port P1 bearing as header information 92 its own MAC address and IP address as the source, and the MAC address and IP address of the destination station A2. The switch accepts this header information on port P1, finds the entry in line 42b, and forwards the frame with header information 94 directly to port P2 with no modifications. FIG. 5c shows the case where the frame is a layer 3 routed frame. In this case, the frame transmitted by A1 has header information 96 indicating that the frame is to move from the 1.0.0.0 subnet to the 1.0.1.0 subnet. In this case, the destination address is the router R1a 90, which inputs the header information received by R1a 90 from the frame 98. The router determines that the destination IP address is associated with MAC address B2, and after modifying the MAC source and destination addresses, sends the frame having header information 100 into port 4 of switch S1 88. The switch S1 88 forwards this frame without modification to port P5 to B2 86, where the frame is properly received. The central role of the router in this configuration is to provide the connectivity between the isolated subnets, which may require isolation for network security, or traffic isolation. As seen earlier, if all of the stations were on the same subnet, no router would be necessary, as the router is the common MAC addressing point between subnets. FIG. 5d shows the case of a layer 3 switched frame crossing from the 1.0.0.0 subnet to the 1.0.1.0 subnet. In this instance, the router has created a forwarding entry 44b in the switch, along with instructions to modify the source and destination MAC addresses to show the packet as originating from the router. This is the process of Layer 3 shortcuts, wherein the layer 2 switch also handles frame switching and re-writing of source and destination MAC addresses in the frame headers. Frame 104 arriving into port P1 is re-written by the switch 88 to contain the header information shown in outgoing frame 106. The process of managing this shortcut database comprises a switch protocol running in each switch, and a router protocol running on each router, wherein the router furnishes information to switches on each separate subnet as to what additional forwarding table entries should be added to enable various types of layer 3 shortcuts.

Figure 6:
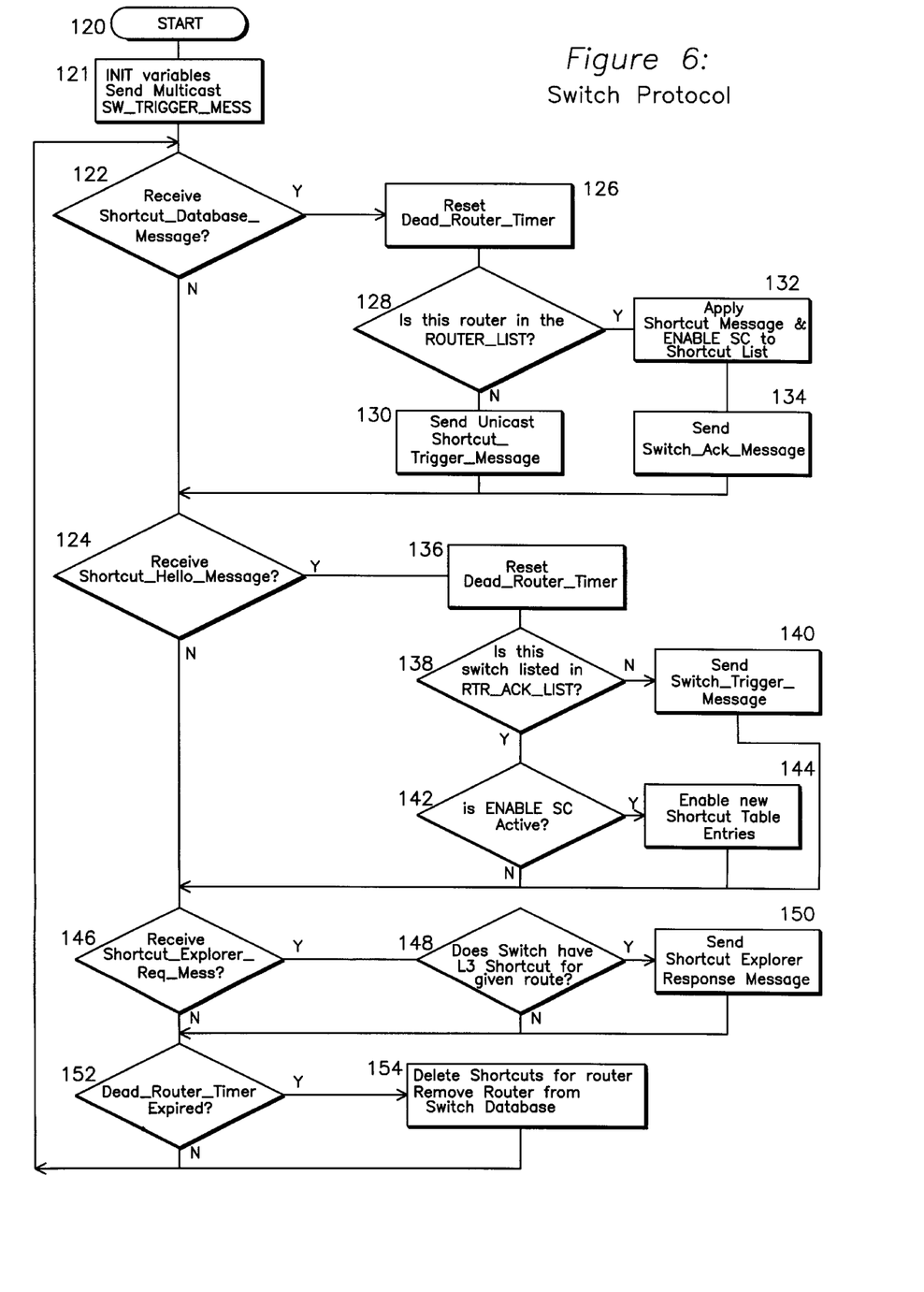
FIG. 6 is a flowchart showing the operation of the shortcut protocol by the switch.

FIG. 6 shows the switch protocol. The switch protocol operates using a separate data structure for each known router, and the router protocol operates on a separate data structure for each switch known to that router. The switch has a unique MAC address, also known as a SWITCH_ID, which is sent with the switch trigger messages and switch acknowledgement messages to identify the sender of these messages to the router receiving them. The protocol entry point is 120, wherein the initialization of variables is done, followed by the transmission of a multicast Switch Trigger Message in 121, which requests the transmission of a Shortcut Database Message from all routers having such shortcuts. If the switch receives a Shortcut Database Message 122, the Dead_Router_Timer is reset 126. Each switch maintains a list of known routers, known as the ROUTER_LIST. If the router is in the ROUTER_LIST in step 128, the list of shortcuts listed in the Shortcut Database Message is added to the forwarding table of FIG. 3 with ENABLE_SC set to 0 in step 132, followed by the transmission of a Switch Acknowledgement Message in step 134, which advises the sending router that the particular Shortcut Database Message was received. If the router sending the Shortcut Database Message is not in the ROUTER_LIST, the switch sends a unicast Shortcut Trigger Message bearing the destination address of the router (ROUTER_ID) of the Shortcut Database Message in step 130. The process of receiving Shortcut Database Messages has two additional components. In actual practice, the Shortcut Database Messages may be fragmented, or sent over many individual frames, so the step 122 of receiving such a frame actually comprises the full and complete reception of all such fragment frames up to and including the final frame, thereby forming a complete and integral Shortcut Database Message. If intervening frames are lost such that the Database message is incomplete, the switch may add these shortcuts to its shortcut table without acknowledging receipt of the Shortcut Database Message, and without resetting the Dead_Router timer. This enables the offloading of the routing load of handling these shortcut packets, and when the Switch Database Message is retransmitted and received in its entirety, the switch may acknowledge this in step 134. As an implementation matter, there may be several queues of incomplete Shortcut Database Messages, with new queues opening up as new routers are detected, and with the queues emptying Shortcut Database Messages to step 122. As is clear to one skilled in the art, Step 122 is shown in a functional manner, while the exact implementation of receiving these messages could be done many different ways, including a single queue, a multiple queue, advance processing of shortcut database messages before complete reception of all, or processing of shortcut database messages only after they are fully received, without changing the operation of the basic algorithm. Step 124 shows the reception of a Shortcut Hello Message, which is sent when the router has received acknowledgment from all the switches that a shortcut database message has been received by all switches known to the router. Upon reception of a Shortcut Hello Message, the Dead Router Timer 136 is reset, and the switch checks the SWITCH_ACK_LIST 138 and ENABLE_SHORTCUT Flag 142 of the Shortcut Hello Message. If the Switch is listed in the SWITCH_ACK_LIST 138 and Enable SC is set, then no response is needed from the switch, and the new shortcut table entries are enabled 144 through bit 47 of FIG. 3. If the switch is not listed in the Router SWITCH_ACK_LIST, then the switch advertises its presence through the transmission of a unicast Shortcut Trigger Message 140. Step 146 is entered upon receipt of a Shortcut Explorer Request Message, wherein the router makes an inquiry as to whether the switch is possessed of a shortcut for a particular route, for which the switch responds with a Shortcut Explorer Response Message 150 if it has a shortcut for the given route. In steps 126 and 136, the receipt of periodic messages from the router indicates the continuing operation of the router, resetting the Dead Router Timer. If the router stops sending these expected messages, the Dead Router Timer expires 152, indicating that the router is no longer actively participating in the protocol, for which the switch deletes shortcuts issued by that router, and deletes the router and any queued Shortcut Database Messages from the switch database 154. The router would ordinarily re-join the protocol by sending a new Shortcut Database Message at some future point in time. The Switch Trigger Message minimally contains the SWITCH_ID, while the Switch Acknowledgement Message minimally contains both the SWITCH_ID and the MESSAGE_NUMBER of the Shortcut Database Message for which the Switch is acknowledging receipt.

Figure 7:
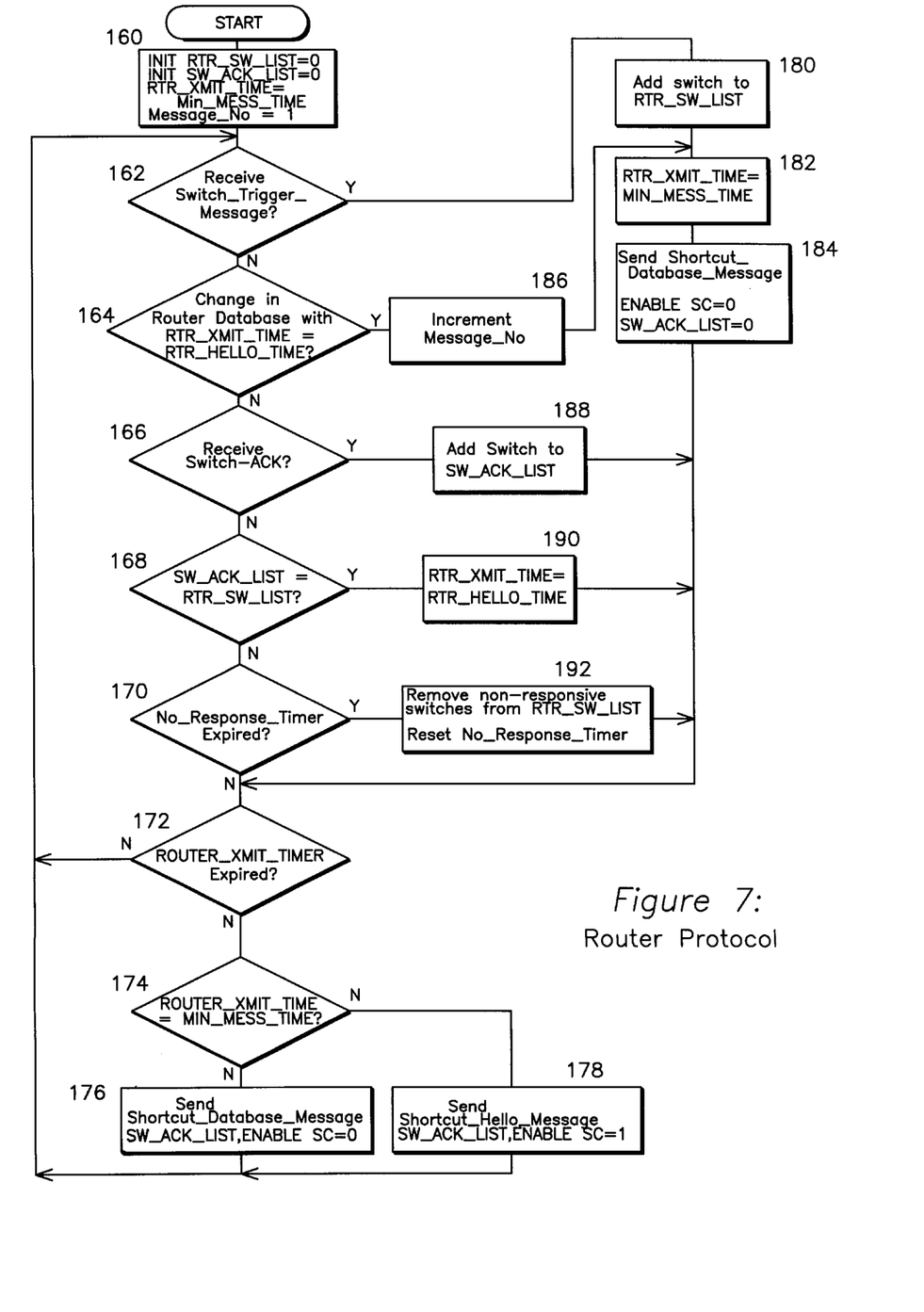
FIG. 7 is a flowchart showing the operation of the shortcut protocol by the router.

FIG. 7 shows the Router Protocol. There is only one instance of such a protocol running in each router. The routine is entered from a reset condition at step 160, and the Router SWITCH_LIST and SWITCH_ACK_LIST are initialized to zero, and Router Transmit Time is initialized to Minimum Message Time, which is the interval between transmission of Shortcut Database Messages, nominally 2 seconds. Upon receipt of a Switch Trigger Message 162 containing a SWITCH_ID, the SWITCH_ID is added to the Router SWITCH_LIST in step 180, the Router Transmit Time is set to the Minimum Message Time, typically 2 seconds, in step 182, and a new Shortcut Database Message 184 is sent. Each Shortcut Database Message comprises a unique router address, known as the ROUTER_ID, a MESSAGE_NUMBER which is incremented whenever the shortcut database changes, a SWITCH_ACK_LIST which contains a list of switches which have acknowledged receipt of this particular Shortcut Database Message, and the actual shortcut database comprising shortcut table entries, as will be described later. When the router database changes 164, the protocol queues the new Shortcut Database Message until such time as the previous Shortcut Database Message has been acknowledged by all switches in the SWITCH_LIST. After all switches known to the router have acknowledged receipt of the previous shortcut database message, the MESSAGE_NUMBER is incremented 186, and as before, the Router Transmit Time is set to Minimum Message Time 182, and the Shortcut Database Message bearing the new MESSAGE_NUMBER is sent. Upon receipt of a Switch Acknowledgement Message in step 166, the SWITCH_ID is added to the SWITCH_ACK_LIST of the Shortcut Database Message in step 188. When all of the switches listed in the Router SWITCH_LIST have sent acknowledgements and appear in the SWITCH_ACK_LIST, the interval between transmissions is set to Router Hello Time, typically 20 seconds, a much longer interval than the Minimum Message Time. If none of the events of 162, 164, 166, 168, or 170 occur, the router waits for the Router Transmit Timer to expire in step 172, where the router either waits a short interval (Minimum Message Time) to re-transmit the shortcut database in step 176, or the router waits a longer interval (Router Hello Time) to send the Shortcut Hello Message 178. The router sends ENABLE_SHORTCUT flag set to disable these new shortcuts while sending the Shortcut Database Messages, and after all switches have acknowledged receipt of the Shortcut Database Message, the ENABLE_SHORTCUT flag is set to enable in subsequent Shortcut Hello Messages. It is clear to one skilled in the art that the transmission of a separate ENABLE_SHORTCUT flag could be eliminated and the receipt by a switch of a Router Hello Message could be separately used to infer the proper reception of Switch Acknowledgement messages from all such switches, thereby enabling Shortcuts previously received in Shortcut Database Messages.

Shortcut Database Messages may be of several types. One type of Shortcut Database Message may be an instruction to add or delete one or more shortcut entries. Another type of Shortcut Database Message may be an instruction to delete the existing shortcut table and replace it with a present shortcut table. As is clear to one skilled in the art, the types of instructions contained in each Shortcut Database Message may be either exhaustive or minimal without affecting the operation of the protocol which guarantees proper and complete reception of these Shortcut Database Messages by all switches on a given subnet before enabling the use of these shortcut entries. The Shortcut Database message contains as a minimum the ROUTER_ID, the SWITCH_ACK_LIST, the MESSAGE_NUMBER, and an ENABLE_SHORTCUT bit, which is generally set to 0 for Shortcut Database Messages, as well as the shortcut list, which may be present in any of the forms earlier discussed; ie. add, delete, replace, etc. The Router Hello Message contains the ROUTER_ID, the SWITCH_ACK_LIST, the MESSAGE_NUMBER, and the ENABLE_SHORTCUT bit is set to 1, which enables the shortcuts received in the preceding Shortcut Database Message.

We claim:

1. A process for reliably sending address table information from a router having a unique ROUTER_ID to a plurality of switches, each switch having a unique SWITCH_ID, said process comprising:

a router protocol for the transmission of a shortcut list comprising either a shortcut database message or a router hello message;

a switch protocol operating on each of said switches for acknowledging error-free reception of said shortcut list;

a router database comprising a SWITCH_LIST, a SWITCH_ACK_LIST, and a shortcut list;

a switch database comprising a ROUTER_LIST and a shortcut table in each of said switches for the application of said shortcut list.

2. The process of claim 1 wherein said router hello message is sent when said SWITCH_ACK_LIST contains each said SWITCH_ID in said SWITCH_LIST, and said shortcut database message is sent if said SWITCH_ACK_LIST does not contain each said SWITCH_ID in said SWITCH_LIST.

3. The process of claim 2 wherein the interval between the transmission of said shortcut database messages is less than the interval between the transmission of said router hello messages.

4. The process of claim 2 wherein said switch protocol comprises the transmission of either a switch trigger message or a switch acknowledgement message.

5. The process of claim 4 wherein said switch trigger message is sent upon the receipt of said router hello message which does not contain said SWITCH_ID in said SWITCH_ACK_LIST.

6. The process of claim 4 wherein said switch trigger message is sent upon the receipt of said shortcut database message or said router hello message which contains a ROUTER_ID not in said ROUTER_LIST.

7. The process of claim 6 wherein said switch trigger message has a layer 2 broadcast destination address.

8. The process of claim 7 wherein said switch acknowledgement message is sent upon receipt of said shortcut database message, and said switch acknowledgement message has a layer 2 unicast destination address of said ROUTER_ID.

9. The process of claim 8 wherein said shortcut database message comprises shortcut table entries which contain network layer 3 or MAC layer 2 address entries.

10. The process of claim 9 wherein said shortcut table entries include at least one layer 3 destination address and one exit port number.

11. The process of claim 9 wherein said shortcut table entries include at least one layer 3 destination address, one layer 3 source address, and one exit port number.

12. The process of claim 9 wherein said shortcut table entries include at least one layer 3 destination address, one layer 3 source address, one layer 3 port number, and one exit port number.

13. The process of claim 10, 11, or 12 wherein said shortcut tables include permit/deny information to enable or disable said shortcut table entries.

14. The process of claim 9 wherein said shortcut database message include instructions to add shortcut table entries from said switch shortcut table.

15. The process of claim 9 wherein said shortcut database message include instructions to delete shortcut table entries from said shortcut table.

16. The process of claim 9 wherein said shortcut database message includes a request for the contents of shortcut table entries in said shortcut table.

17. A process for the transmission of shortcut database messages from a router having a unique ROUTER_ID to a plurality of switches, each of said switches having a unique SWITCH_ID, said process comprising the steps:

said switch transmitting a switch trigger message containing said SWITCH_ID upon initialization of said switch;

said router maintaining a list of known switches in a SWITCH_LIST and a list of switches having sent switch acknowledgement message in a SWITCH_ACK_LIST, and upon receipt of said switch trigger message, thereafter adding said SWITCH_ID to said SWITCH_LIST, and upon receipt of said switch acknowledgement message, adding said SWITCH_ID to said SWITCH_ACK_LIST;

said router, if said SWITCH_ACK_LIST contains different said SWITCH_IDs than said SWITCH_LIST, sending a shortcut database message containing said ROUTER_ID, said SWITCH_ACK_LIST, a MESSAGE_NUMBER, an ENABLE_SHORTCUT field, and a list of shortcuts;

said router, if said SWITCH_ACK_LIST contains same said SWITCH_IDs as said SWITCH_LIST, sending a router hello message containing at least said ROUTER_ID, said ENABLE_SHORTCUT, and at least said SWITCH_ACK_LIST;

said switch, upon receipt of said shortcut database message, sending to said router said switch acknowledgement message containing said SWITCH_ID, and thereafter applying the contents of said list of shortcuts and said ENABLE_SHORTCUT to a switch shortcut table having one or more shortcut table entries, said ENABLE_SHORTCUT enabling or disabling said shortcut table entry.

18. The process of claim 17 wherein said shortcut database message comprises shortcut table entries which contain network layer 3 forwarding entries.

19. The process of claim 17 wherein said shortcut table entries include at least one layer 3 destination address and one exit port number.

20. The process of claim 17 wherein said shortcut table entries include at least one layer 3 destination address, one layer 3 source address, and one exit port number.

21. The process of claim 17 wherein said shortcut table entries include at least one layer 3 destination address, one layer 3 source address, one layer 3 port number, and one exit port number.

22. The process of claim 18, 19, 20, or 21 wherein said interval between transmission of said shortcut database messages is greater than the interval between transmission of said router hello messages.

23. The process of claim 18, 19, 20, or 21 wherein said MESSAGE_NUMBER is uniquely assigned by each router sending said shortcut database messages, and said MESSAGE_NUMBER is incremented when said shortcut database changes.

24. The process of claim 18, 19, 20, or 21 wherein said shortcut tables include permit/deny information to enable or disable said shortcut table entries.

25. The process of claim 17 wherein said shortcut database message includes instructions to add said shortcut table entries to said switch shortcut table.

26. The process of claim 17 wherein said shortcut database message includes instructions to delete shortcut table entries from said switch shortcut table.

27. The process of claim 17 wherein said shortcut database message includes a request for the transmission of said shortcut table entries.

* * * * *